United States Patent [19]

White

[11] Patent Number: 4,670,537
[45] Date of Patent: Jun. 2, 1987

[54] POLYPHENYLENE ETHER CONTAINING AMINO-ALKYL SUBSTITUTED END GROUPS REACTED WITH N—H COMPOUND

[75] Inventor: Dwain M. White, Schenectady, N.Y.

[73] Assignee: General Electric Company, Schenectady, N.Y.

[21] Appl. No.: 818,621

[22] Filed: Jan. 14, 1986

[51] Int. Cl.[4] .............................................. C08G 63/62
[52] U.S. Cl. .................................... 528/390; 525/391; 525/397; 525/534; 528/212
[58] Field of Search ............... 525/534, 390, 391, 397; 528/212

[56] References Cited

U.S. PATENT DOCUMENTS 4,058,504  11/1977  Yonemitsu et al. ................. 525/534

Primary Examiner—Harold D. Anderson
Attorney, Agent, or Firm—William H. Pittman; James C. Davis, Jr.; James Magee, Jr.

[57] ABSTRACT

Polyphenylene ethers containing aminoalkyl-substituted end groups are sometimes undesirably reactive and unstable, especially at high temperatures. This problem is solved by reacting them, at temperatures within the range of about 200°–300° C., with nitrogen compounds containing at least one N—H moiety, such as ε-caprolactam.

16 Claims, No Drawings

POLYPHENYLENE ETHER CONTAINING AMINO-ALKYL SUBSTITUTED END GROUPS REACTED WITH N—H COMPOUND

This invention relates to the chemistry of polyphenylene ethers, and more particularly to the inactivation of chemically reactive end groups therein.

Polyphenylene ethers (also known as polyphenylene oxides) are a well known class of polymers. They are widely used in industry, especially as engineering plastics in applications requiring toughness and heat resistance. Since their discovery, they have given rise to numerous variations and modifications, including but not limited to those described hereinafter.

The polyphenylene ethers comprise a plurality of structural units having the formula

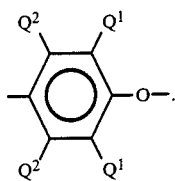 (I)

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymer and copolymer polyphenylene ethers are known. The homopolymers include those containing, for example, 2,6-dimethyl-1,4-phenylene ether units. The copolymers include random copolymers containing such units in combination with (for example) 2,3,6-trimethyl-1, 4-phenylene ether units. Many suitable random copolymers, as well as homopolymers, are disclosed in the patent literature.

Also known are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other polyphenylene ethers are coupled polymers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

Polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. For the most part, they contain at least one heavy metal compound such as a copper, manganese or cobalt compound, usually in combination with various other materials.

Catalyst systems containing a copper compound are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Other catalyst systems contain manganese compounds. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also known are cobalt-containing catalyst systems. Suitable manganese and cobalt-containing catalyst systems for polyphenylene ether preparation are known in the art by reason of disclosure in numerous patents and publications.

The present invention relates specifically to polyphenylene ethers comprising molecules having end groups of the formula

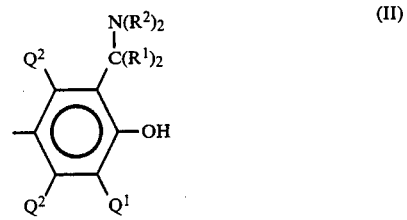 (II)

(hereinafter "aminoalkyl end groups"), wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Such polymers are typically obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl end groups may undergo various reactions, probably involving a quinone methide-type intermediate of the formula

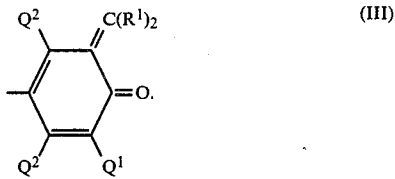

These aminoalkyl end groups have numerous effects on the chemistry of the polyphenylene ether. Many of these effects are beneficial, often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Other effects of the aminoalkyl end groups, however, may be detrimental under certain circumstances. For example, substantial increases in the molecular weight of the polyphenylene ether can occur as a result of deamination to a quinone methide of formula III followed by coupling of two molecules of the deaminated polymer. Such molecular weight increases may be undesirable when close control of the molecular weight of the polyphenylene ether is necessary. Also, block copolymers formed by reactions involving the aminoalkyl end groups may be relatively unstable at high temperatures. Specific reference in this regard is made to the polyphenylene ether-polycarbonate block copolymers disclosed in copending, commonly owned application Ser. No. 810,613, filed Dec. 19, 1985, the disclosure of which is incorporated by reference herein.

A principal object of the present invention, therefore, is to prepare polyphenylene ethers having improved stability, particularly at high temperatures.

A further object is to improve the stability of polyphenylene ethers by chemical treatment of aminoalkyl end groups thereon.

Other objects will in part be obvious and will in part appear hereinafter.

The present invention is based on the discovery that aminoalkyl end groups in polyphenylene ethers react with various nitrogen compounds to form derivatives which are, for the most part, characterized by improved thermal stability. The nitrogen compounds which react in this way include amides, amidines, imides, sulfonamides and amino acids, which may be acyclic, carbocyclic or heterocyclic.

Accordingly, an aspect of this invention is a method for converting a polyphenylene ether having aminoalkyl-substituted end groups to derivatives of increased stability which comprises reacting said polyphenylene ether, at a temperature within the range of about 200°–300° C., with at least one nitrogen-containing compound wherein at least one NH moiety forms part of an amide, imide, amidine, 2-aminocarboxylic acid or sulfonamide group.

The polyphenylene ethers useful in this invention are those previously described, particularly the poly(2,6-dimethyl-1,4-phenylene) ethers. Although the molecular weight of the polyphenylene ether is not critical for the purposes of the invention, polymers having a number average molecular weight within the range of about 3,000–40,000 and a weight average molecular weight within the range of about 20,000–80,000, as determined by gel permeation chromatography, are readily available commercially and are therefore particularly contemplated. The intrinsic viscosities of such polymers are most often in the range of about 0.35–0.6 dl./g., as measured in chloroform at 25° C.

According to the invention, the polyphenylene ether is reacted with at least one nitrogen-containing compound hereinafter sometimes denoted "inactivating agent". The nitrogen compound contains at least one NH moiety which forms part of an amide, imide, amidine, 2-aminocarboxylic acid or sulfonamide group.

A wide variety of nitrogen-containing compounds are useful as inactivating agents. For the most part, they may be represented by the formula

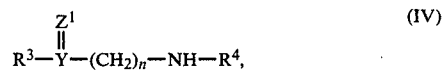

wherein:

$R^3$ is hydrogen, hydroxy, amino, alkyl, aryl or aralkyl;

$R^4$ is hydrogen, alkyl, aryl or aralkyl;

or $R^3$ and $R^4$ together form an alkylene, ketoalkylene, ketoarylene or $\alpha$-aza-$\beta$-ketoalkylene group;

Y is carbon or

$Z^1$ is O or $NR^5$;

or $R^5$ and $R^4$ together form a substituted or unsubstituted ethylene or trimethylene radical or corresponding olefinic radical; and n is 0 or 1.

As will be apparent from the formula, the compounds in which Z is $NR^5$ and $R^5$ and $R^4$ are taken together are cyclic amidines. The $R^5$—$R^4$ combination therein is usually unsubstituted but may contain relatively inert substituents such as alkyl (especially $C_{1-3}$ alkyl), aryl or alkoxy.

The compounds in which Z is O may be amides, imides, amino acids or sulfonamides. For the most part, the imides are cyclic (i.e., $R^3$ and $R^4$ together are ketoalkylene or ketoarylene); the amides may be acyclic or carbocyclic ($R^3$ is alkyl, aryl, aralkyl or amino and $R^4$ is hydrogen, alkyl, aryl or aralkyl) or may be lactams ($R^3$ and $R^4$ together are alkylene or $\alpha$-aza-$\beta$-ketoalkylene, the latter being present in such compounds as diketopiperazine, the condensation dimer of glycine). In the amino acids, n is 1; otherwise it is zero.

The following inactivating agents are illustrative.

Amidines: imidazole, tetrahydropyrimidine.
Acyclic and carbocyclic amides: acetamide, N-methylacetamide, acetanilide, benzamide, N-methylbenzamide, N-benzylbenzamide, benzanilide, urea.
Cyclic amides: 2-pyrrolidone, $\epsilon$-caprolactam, diketopiperazine.
Imides: succinimide, maleimide, phthalimide.
Sulfonamides: benzenesulfonamide.
Amino acids: glycine.

ε-Caprolactam is a particularly preferred inactivating agent, by reason of the particular stability of the polyphenylene ethers obtained by its use.

According to the invention, the inactivating agent is reacted with the polyphenylene ether at a temperature in the range of about 200°–300° C. It is generally preferred to conduct the reaction in the melt, although it is also contemplated to use solvents which have boiling points high enough to permit their utilization at the temperatures required. Such solvents ordinarily serve only as reaction media and do not contribute to the essential properties of the inactivated polymers.

In general, the reaction mixture will consist essentially of the polyphenylene ether and inactivating agent. In any event, it should be free from materials which catalyze polymerization of the inactivating agent, such as water or extraneous acids or bases when said agent is a lactam, since polymerization of the inactivating agent is not desired.

The proportion of inactivating agent in the reaction mixture should generally be a large excess, to ensure complete inactivation of the aminoalkyl end groups. In general, a 50–1000% excess and preferably a 100–500% excess is used, based on the molecular weight of the polymer and the proportion of aminoalkyl end groups therein as determined by suitable analysis.

Another aspect of the invention is polyphenylene ethers which have been inactivated by the above-described method. As shown by analytical methods such as carbon-13 nuclear magnetic resonance, the polymeric compositions thus obtained comprise polyphenylene ethers containing end groups having the formula

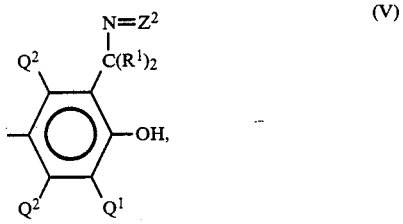

wherein $Q^1$, $Q^2$ and $R^1$ are as previously defined and $N=Z^2$ is an amide, imide, amidine, 2-aminocarboxylic acid or sulfonamide group. Most often, $N=Z^2$ has the formula

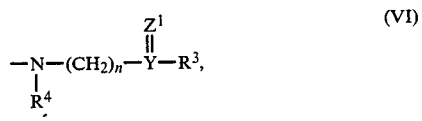

wherein $R^3$, $R^4$, $Z^1$ and $n$ are as previously defined. However, the inactivated polymer may also contain other molecular species, the exact structures of which are not presently known with certainty. Therefore, the compositions of this invention are also appropriately defined in terms of the method for their preparation.

The invention is illustrated by the following examples. The polyphenylene ether used in these examples was a poly(2,6-dimethyl-1,4-phenylene ether) having a number average molecular weight of about 20,000 and an intrinsic viscosity in chloroform at 25° C. of about 0.48 dl./g.

EXAMPLE 1

A mixture of 1 gram of polyphenylene ether and 1 gram of ε-caprolactam was heated under nitrogen, with stirring, to 270° C. At about 250° C., a clear, colorless melt was obtained. Stirring was continued for 2 minutes at 270° C., after which the mixture was rapidly cooled. The product was dissolved in 15 ml. of chloroform and precipitated by slowly adding 75 ml. of methanol. The precipitate was filtered, washed with methanol, redissolved in toluene and reprecipitated by methanol, again washed with methanol and dried. The carbon-13 nuclear magnetic resonance spectrum of the product showed the presence of end groups of the formula

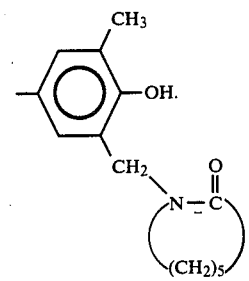

This product was stable at temperatures up to 290° C.

EXAMPLES 2–11

Following the procedure of Example 1, various nitrogen compounds were reacted with polyphenylene ether to prepare products similar to that of Example 1. The nitrogen compounds and conditions of heating are listed in the following table. In Example 2, a homogeneous mixture of polyphenylene and nitrogen compound was formed under the conditions of the reaction. In Examples 7 and 11 a partially homogeneous mixture was obtained, and in the remaining examples the polyphenylene ether was not substantially soluble in the nitrogen compound.

| Example | Nitrogen compound | Temperature, °C. | Time, min. |
| --- | --- | --- | --- |
| 2 | 2-Pyrrolidinone | 245–250 | 3 |
| 3 | Acetamide | 220 | 3 |
| 4 | N—Methylacetamide | 204 | 3 |
| 5 | Benzamide | 270–280 | 3 |
| 6 | N—Methylbenzamide | 270–286 | 2 |
| 7 | N—Benzylbenzamide | 270–290 | 2.5 |
| 8 | Benzanilide | 270–290 | 2 |
| 9 | Urea | 305 | 10 |
| 10 | Glycine* | 220 | 15 |
| 11 | Imidazole | 266 | 2 |

*Carbon-13 NMR spectrum indicated presence also of diketopiperazine-derived product.

What is claimed is:

1. A method for converting a polypheylene ether having aminoalkyl-substituted end groups to derivatives of increased stability which comprises reacting said polyphenylene ether, at a temperature within the range of about 200°–300° C., with at least one compound containing at least one NH moiety as part of an amide, imide, amidine, 2- aminocarboxylic acid or sulfonamide group.

2. A method according to claim 1 wherein the polyphenylene ether is a poly(2,6-dimethyl-1,4-phenylene) ether.

3. A method according to claim 2 wherein reactants consist essentially of said polyphenylene ether and nitrogen-containing compound.

4. A method according to claim 3 wherein the nitrogen-containing compound has the formula

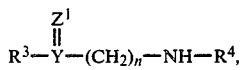  (IV)

wherein:
R$^3$ is hydrogen, hydroxy, amino, alkyl, aryl or aralkyl;
R$^4$ is hydrogen, alkyl, aryl or aralkyl;
or R$^3$ and R$^4$ together form an alkylene, ketoalkylene, ketoarylene or α-aza-β-ketoalkylene group;
Y is carbon or

Z$^1$ is O or NR$^5$;
or R$^5$ and R$^4$ together form a substituted or unsubstituted ethylene or trimethylene radical or corresponding olefinic radical; and
n is 0 or 1.

5. A method according to claim 4 wherein the aminoalkyl-substituted end groups have the formula

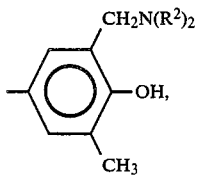  (II)

wherein each R$^2$ is independently hydrogen or a C$_{1-6}$ primary alkyl radical.

6. A method according to claim 4 wherein the nitrogen-containing compound is at least one compound selected from the group consisting of imidazole, tetrahydropyrimidine, acetamide, N-methylacetamide, acetanilide, benzamide, N-methylbenzamide, N-benzylbenzamide, benzanilide, urea, 2-pyrrolidone, ε-caprolactam, diketopiperazine, succinimide, maleimide, phthalimide, benzenesulfonamide and glycine.

7. A method according to claim 6 wherein the nitrogen-containing compound is ε-caprolactam.

8. A composition comprising the polyphenylene ether derivative prepared by the method of claim 1.

9. A composition comprising the polyphenylene ether derivative prepared by the method of claim 3.

10. A composition comprising polyphenylene ether derivative prepared by the method of claim 5.

11. A composition comprising polyphenylene ether derivative prepared by the method of claim 6.

12. A composition comprising a polyphenylene ether containing end groups having the formula

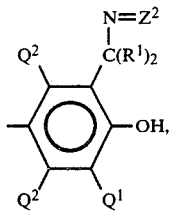  (V)

wherein:
each Q$^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms;
each Q$^2$ is independently hydrogen, halogen, primary or secondary lower alkyl, phenyl, haloalkyl, hydrocarbonoxy or halohydrocarbonoxy as defined for Q$^1$;
each R$^1$ is independently hydrogen or alkyl, with the proviso that the total number of carbon atoms in both R$^1$ radicals is 6 or less; and
N=Z$^2$ is an amide, imide, amidine, 2-aminocarboxylic acid or sulfonamide group.

13. A composition according to claim 12 wherein the polyphenylene ether is a poly(2,6-dimethyl-1,4-phenylene) ether, Q$^1$ is methyl, and each Q$^2$ and each R$^1$ is hydrogen.

14. A composition according to claim 13 wherein N=Z$^2$ has the formula

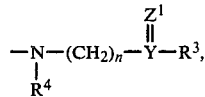  (VI)

wherein:
R$^3$ is hydrogen, hydroxy, amino, alkyl, aryl or aralkyl;
R$^4$ is hydrogen, alkyl, aryl or aralkyl;
or R$^3$ and R$^4$ together form an alkylene, ketoalkylene, ketoarylene or α-aza-β-ketoalkylene group;
Y is carbon or

Z$^1$ is O or NR$^5$;
or R$^5$ and R$^4$ together form a substituted or unsubstituted ethylene or trimethylene radical or corresponding olefinic radical; and
n is 0 or 1.

15. A composition according to claim 14 wherein N=Z$^2$ is derived from at least one compound selected from the group consisting of imidazole, tetrahydropyrimidine, acetamide, N-methylacetamide, acetanilide, benzamide, N-methylbenzamide, N-benzylbenzamide, benzanilide, urea, 2-pyrrolidone, ε-caprolactam, diketopiperazine, succinimide, maleimide, phthalimide, benzenesulfonamide and glycine.

16. A composition according to claim 15 wherein N=Z$^2$ is derived from ε-caprolactam.

* * * * *